United States Patent
March et al.

(10) Patent No.: US 7,068,655 B2
(45) Date of Patent: Jun. 27, 2006

(54) NETWORK ADDRESS AND/OR PORT TRANSLATION

(75) Inventors: Sean W. March, Plano, TX (US); Patrick N. Sollee, Richardson, TX (US); David W. McKnight, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 861 days.

(21) Appl. No.: 09/881,595

(22) Filed: Jun. 14, 2001

(65) Prior Publication Data

US 2003/0007486 A1 Jan. 9, 2003

(51) Int. Cl.
*H04L 12/28* (2006.01)

(52) U.S. Cl. .................... 370/392; 370/401
(58) Field of Classification Search ............. 370/389, 370/392, 401, 474, 475
See application file for complete search history.

(56) References Cited

U.S. PATENT DOCUMENTS

| | | | | |
|---|---|---|---|---|
| 6,058,431 A * | 5/2000 | Srisuresh et al. | ............ | 709/245 |
| 6,128,298 A | 10/2000 | Wootton et al. | ............ | 370/392 |
| 6,389,462 B1 * | 5/2002 | Cohen et al. | ............... | 709/218 |
| 6,510,154 B1 * | 1/2003 | Mayes et al. | ............... | 370/389 |
| 6,650,641 B1 * | 11/2003 | Albert et al. | ............... | 370/392 |
| 6,697,354 B1 | 2/2004 | Borella et al. | | |
| 6,697,377 B1 * | 2/2004 | Ju et al. | ............... | 370/466 |
| 6,731,642 B1 * | 5/2004 | Borella et al. | ............... | 370/401 |
| 6,822,957 B1 * | 11/2004 | Schuster et al. | ............ | 370/389 |
| 6,829,239 B1 * | 12/2004 | Bhatia et al. | ............... | 370/392 |
| 6,880,089 B1 | 4/2005 | Bommareddy et al. | | |
| 6,892,245 B1 * | 5/2005 | Crump et al. | ............... | 709/245 |
| 2002/0037723 A1 | 3/2002 | Roach | | |
| 2002/0042832 A1 | 4/2002 | Fallentine et al. | | |
| 2002/0078198 A1 | 6/2002 | Buchbinder et al. | | |
| 2002/0120760 A1 | 8/2002 | Kimchi et al. | | |
| 2002/0122416 A1 | 9/2002 | Xu et al. | | |
| 2002/0169842 A1 | 11/2002 | Christensen et al. | | |
| 2002/0184316 A1 | 12/2002 | Thomas et al. | | |
| 2003/0009534 A1 | 1/2003 | Yamagishi | | |
| 2004/0095937 A1 | 5/2004 | Piche et al. | | |
| 2004/0153549 A1 | 8/2004 | Naito et al. | | |
| 2004/0230688 A1 * | 11/2004 | Gbadegesin | ................ | 709/228 |

FOREIGN PATENT DOCUMENTS

| | | |
|---|---|---|
| WO | WO 97/40610 | 10/1997 |
| WO | WO 00/78008 | 12/2000 |
| WO | WO 01/37510 A2 | 5/2001 |

(Continued)

OTHER PUBLICATIONS

H. Schulzrinne, *The Session Initiation Protocol: Internet-Centric Signaling*, IEEE Communications Magazine, IEEE Service Center, Piscataway, vol. 38, No. 10, Oct. 2000, pp. 134-141.

(Continued)

*Primary Examiner*—Andrew C. Lee
(74) *Attorney, Agent, or Firm*—Trop, Pruner & Hu PC

(57) ABSTRACT

A method and apparatus for communicating data units (e.g., Internet Protocol or IP packets) between devices on one or more networks includes storing address and/or port translation information, and receiving a data unit having a source address and port and a destination address and port. Both the source and destination addresses and/or ports are translated, with the data unit containing the translated source and destination addresses and/or ports transmitted to a destination.

24 Claims, 7 Drawing Sheets

FOREIGN PATENT DOCUMENTS

| | | |
|---|---|---|
| WO | WO 02/03217 | 1/2002 |
| WO | WO 02/11400 | 2/2002 |

OTHER PUBLICATIONS

J. Rosenberg et al., *SIP Traversal Through Residential And Enterprise NATs and Firewalls*, Internet Draft, Online, Mar. 2, 2001, pp. 1-22.

W. Marshall et al., *SIP Extensions For Caller Identity and Privacy*, Internet Engineering Task Force Internet Draft, May 2001, pp. 1-24.

Information Science Institute, *Internet Protocol, Darpa Internet Program Protocol Specification*, RFC 791, pp. 1-44 (Sep. 1981).

J. Postel, *User Datagram Protocol*, RFC 768, pp. 1-3 (Aug. 1980).

S. Deering, Network Working Group Request for Comments: 2460, *Internet Protocol, Version 6 (IPv6) Specification*, pp. 1-33 (Dec. 1998).

H. Shulzrinne, Network Working Group Request for Comments: 1889, *RTP: A Transport Protocol for Real-Time Applications*, pp. 1-63 (Jan. 1996).

M. Handley, Network Working Group Request for Comments: 2543, *SIP: Session Initiation Protocol*, pp. 1-128 (Mar. 1999).

M. Arango, Network Working Group Request for Comments: 2705, *Media Gateway Control Rpotocol (MGCP)*, pp. 1-113 (Oct. 1999).

* cited by examiner

NETWORK ADDRESS AND/OR PORT TRANSLATION

TECHNICAL FIELD

The invention relates generally to network address and/or port translation.

BACKGROUND

Various forms of communications can be performed in packet-based networks, such as electronic mail, web browsing, file transfer, and so forth. With the increased capacity and reliability of packet-based networks, voice communications (along with other forms of real-time, interactive communications) have also become feasible. In such communications, voice and other real-time data are carried in packets that are sent across the network.

Various standards have been proposed for voice and multimedia communications over packet-based networks. One such standard is the H.323 Recommendation from the International Telecommunication Union (ITU). Another standard for voice and multimedia communications is the Session Initiation Protocol (SIP), as developed by the Internet Engineering Task Force (IETF). Generally, H.323, SIP, and other control protocols are used for negotiating session information to coordinate the establishment of a call session. Once negotiation setup has been completed, packetized media (including voice or other forms of real-time data) can flow between endpoints. A media transport protocol, such as the Real-Time Protocol (RTP), is used for conveying packetized media between the endpoints.

Various issues are associated with communications over packet-based networks. One is the dwindling supply of network addresses, such as Internet Protocol (IP) addresses. To address this problem, network address translation (NAT) is provided to enable address translations between public and private networks. By reusing a pool of private addresses in different private networks, the virtual supply of network addresses is extended. Another concern of packet-based communications is security. Once a network address of a specific node is known, this network address can be used as routing information to gain illegal access to the node and all of its resources. Network address translation can be used to hide network addresses of nodes to protect such nodes.

To communicate over a public network (e.g., the Internet), an endpoint typically goes through an intermediary system, such as a service provider. The service provider may offer various services, such as electronic mail, web browsing, voice communications, and other services. Such services can be offered by one or more nodes associated with the service provider. However, in communications between endpoints that involve a service provider or other intermediary entity, conventional address translation and security mechanisms may not provide the desired functions or features.

SUMMARY

In general, in accordance with an embodiment, a system capable of communicating with plural devices on one or more networks includes a storage module to store address and/or port translation information, and a controller adapted to receive a data unit from a first network, the data unit having a source address and port and a destination address and port. The controller is adapted to further translate both the source address and/or port and the destination address and/or port of the data unit based on the address translation information.

Some embodiments may have one or more of the following advantages. Network address and/or port translation enables the use of network address and/or port translation in an intermediary system, such as a system associated with a service provider or other entity that provides call processing management and routing for user terminals. By performing network address and/or port translation, the use of private addresses and ports increases the number of virtual addresses and ports available to users. Also, security is enhanced for nodes associated with the service provider or other entity by using network address and/or port translation. Also, the intermediary system is able to hide the identities of endpoints involved in a call session from each other, providing a level of privacy in the call.

Other or alternative features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
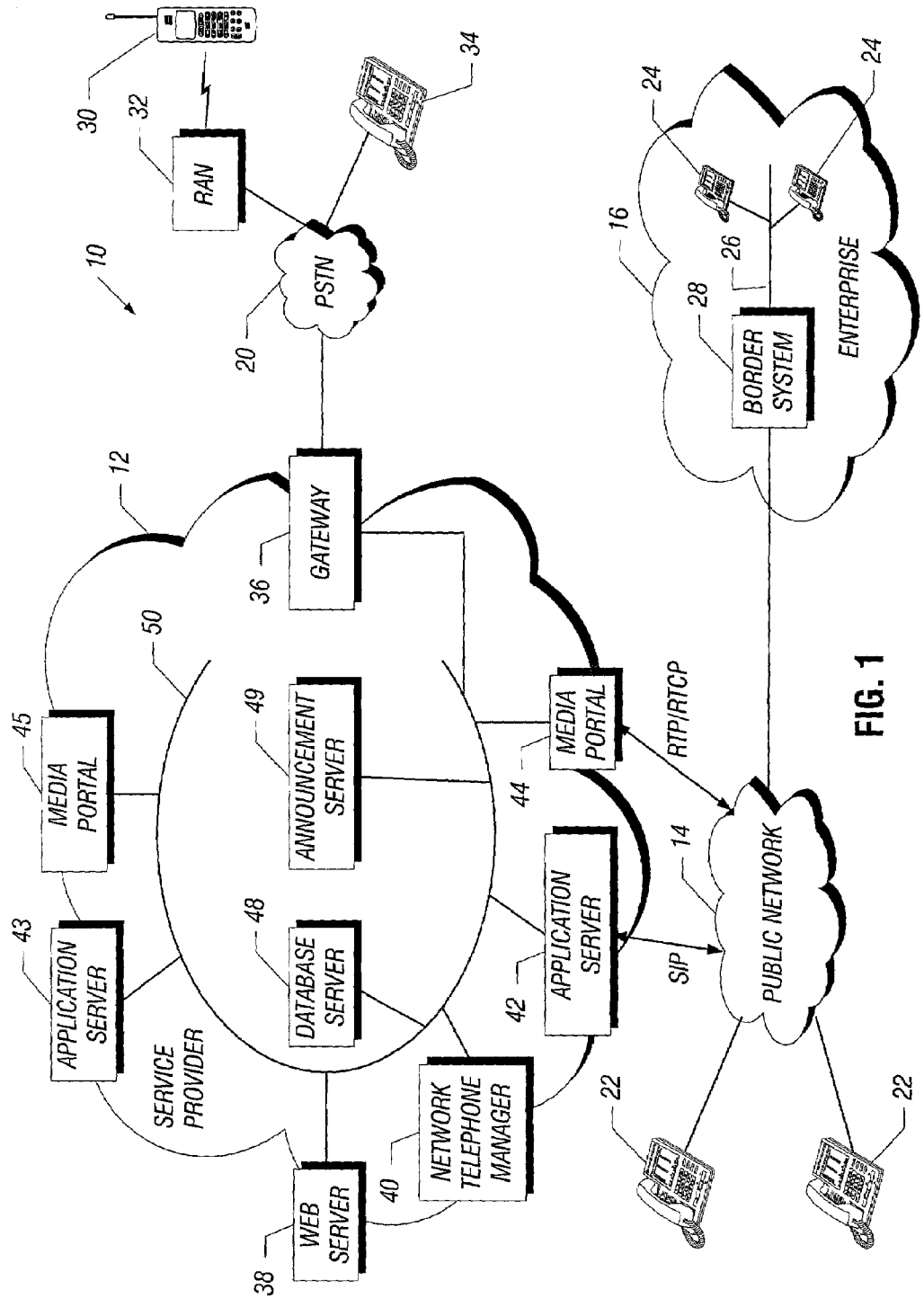
FIG. 1 is a block diagram of an example communications system that incorporates an embodiment of the invention.

Referring to FIG. 1, a communications system 10 includes a public network (e.g., the Internet) 14, an enterprise 16 (e.g., a company, a government agency, a university, or other organization of multiple users), a service provider 12, and a public switched telephone network (PSTN) 20. The arrangement of FIG. 1 is shown for purposes of illustration and example, since other embodiments can have other arrangements.

The service provider 12 includes a private network 50 coupled to various internal nodes, and the enterprise 16 includes a private network 26 coupled to various internal nodes and terminals. The service provider 12 enables access by subscribers of various resources in the communications system 10, including the public network 14 and the PSTN 20. Thus, a user station coupled to the public network 14, such as one of user stations 22 or one of user stations 24 in the enterprise 16, can perform various forms of communications through the service provider 12. Examples of possible communications include electronic mail, web browsing, and real-time, interactive communications (e.g., voice, video conferencing, and so forth).

The user stations 24, which are connected to the enterprise private network 26, communicate with the public network 14 through a border system 28. In one example, the border system 28 includes a firewall and network address and port translation capabilities.

The user stations 22 and 24 can be network telephones (which are telephones including a network interface to enable communication with a packet-based network), computers fitted with voice processing capabilities (referred to as "softphones"), or other terminals capable of participating in real-time, interactive communications sessions. One example of a network telephone is the i2004 telephone from Nortel Networks. One example of an application that is executable in a computer to enable voice capabilities is the i2050 product from Nortel. Examples of other user stations that can be endpoints of communications sessions include mobile stations 30 coupled by wireless links to a radio access network (RAN) 32, which is in turn connected to the PSTN 20. Also, a wired telephony device 34 can be coupled to the PSTN 20.

The service provider 12 includes various components that are visible on the public network 14, including a web server 38, a network telephone manager 40, application servers 42 and 43, and media portals 44 and 45. The service provider 12 includes internal nodes that are not visible to the public network 14, including a gateway 36 to the PSTN 20, a database server 48, an announcement server 49, and other nodes (not shown). The gateway 36 translates between call control signaling and media according to a first format (e.g., packet-based format) used on the public network 14 and another format (e.g., circuit-switched format) used on the PSTN 20. The database server 48 stores information of registered devices, including information relating to which domain the devices are in, subscriber information, subscribed services, and other information. The announcement server 49 can be used to play an announcement for certain incoming calls.

The web server 38 presents web pages that can be browsed by users on the public network 14. The network telephone manager 40 is used for managing network telephones. The network telephone manager 40 generates and receives call control signaling on behalf of the network telephones. Once a call is established, media is communicated directly with a respective network telephone. In other embodiments, the network telephones may be capable of exchanging and processing call control signaling without the assistance of the network telephone manager 40.

The application server 42 or 43 communicates call control signaling with stations or nodes on the public network 14 or on the private network 50 for establishing a call. Once the call is established, media or bearer traffic is communicated through the media portal 44 or 45 between endpoints. In one embodiment, the media packets can contain Real-Time Protocol (RTP) data that are carried within a User Datagram Protocol (UDP)/Internet Protocol (IP) packet.

In one example, call control signaling for establishing a call session is according to a Session Initiation Protocol (SIP). SIP is part of the multimedia data and control architecture from the IETF, and one version of SIP is described in Request for Comments (RFC) 2543, entitled "SIP: Session Initiation Protocol," dated 1999. SIP can be used to initiate call sessions as well as to invite members to a session that may have been advertised by some other mechanism, such as electronic mail, web pages, and so forth. RTP, which defines a protocol for transporting real-time data, is described in RFC 1889 entitled "RTP: A Transport Protocol for Real-Time Applications," dated January 1996. UDP defines a transport layer that is described in RFC 768, entitled "User Datagram Protocol," dated August 1980. One version of IP is described in RFC 791, entitled "Internet Protocol," dated September 1981, while another version of IP is described in RFC 2460, entitled "Internet Protocol, Version 6 (IPv6) Specification," dated December 1998. Other standards can also be employed to provide call control signaling, such as the H.323 Recommendation from the International Telecommunication Union (ITU).

As used here, a "call session" refers generally to a real-time, interactive communications session that involves the exchange of real-time data between multiple parties. An interactive communications session refers to a session in which two or more parties are involved in an exchange of data. A real-time, interactive communication session refers to an exchange of data, such as audio and/or video data, on a substantially real-time basis between two endpoints. A session is substantially real-time if interaction is occurring between two endpoints with communication from one endpoint followed relatively quickly by a response or another communication from the other endpoint. A "call request" is a message for establishing a call session. A "media packet" or "media data unit" refers to a packet or data unit carrying bearer traffic (e.g., voice, video, etc.) in a call session.

In accordance with some embodiments of the invention, the media portal 44 or 45 includes a network address and port translation (NAPT) module that translates both the source and destination addresses (e.g., IP addresses) and ports (e.g., UDP ports) of each received packet. This is a departure from standard network address and port translators, which typically translate only one of the source and destination addresses for a given direction of the media packet. Although reference is made to an NAPT module that translates both network addresses and ports, other embodiments may involve translation modules that translate only the network address or only the port. Calls handled through the service provider 12 can involve endpoints that are both located outside the private network 50, such as user stations 22 and/or user stations 24. Alternatively, a call can involve an endpoint outside the service provider private network 50 and a node on the service provider private network 50, such as the gateway 36 or the announcement server 49.

One benefit of using the NAPT module in accordance with some embodiments is that the NAPT module is able to hide or shield the identities of endpoints from each other (whether the endpoints are on the public network 14 or on the service provider private network 50). Thus, a level of privacy is provided for users of the service provider 12. Another benefit of the NAPT module in the media portal 44 or 45 is that use of private network addresses on the service provider private network 50 is enabled, which reduces the number of public network addresses and ports consumed by the service provider 12. In addition, the NAPT module enhances security of the service provider private network 50, since network addresses of the components are hidden from the public network 14.

Figure 2:
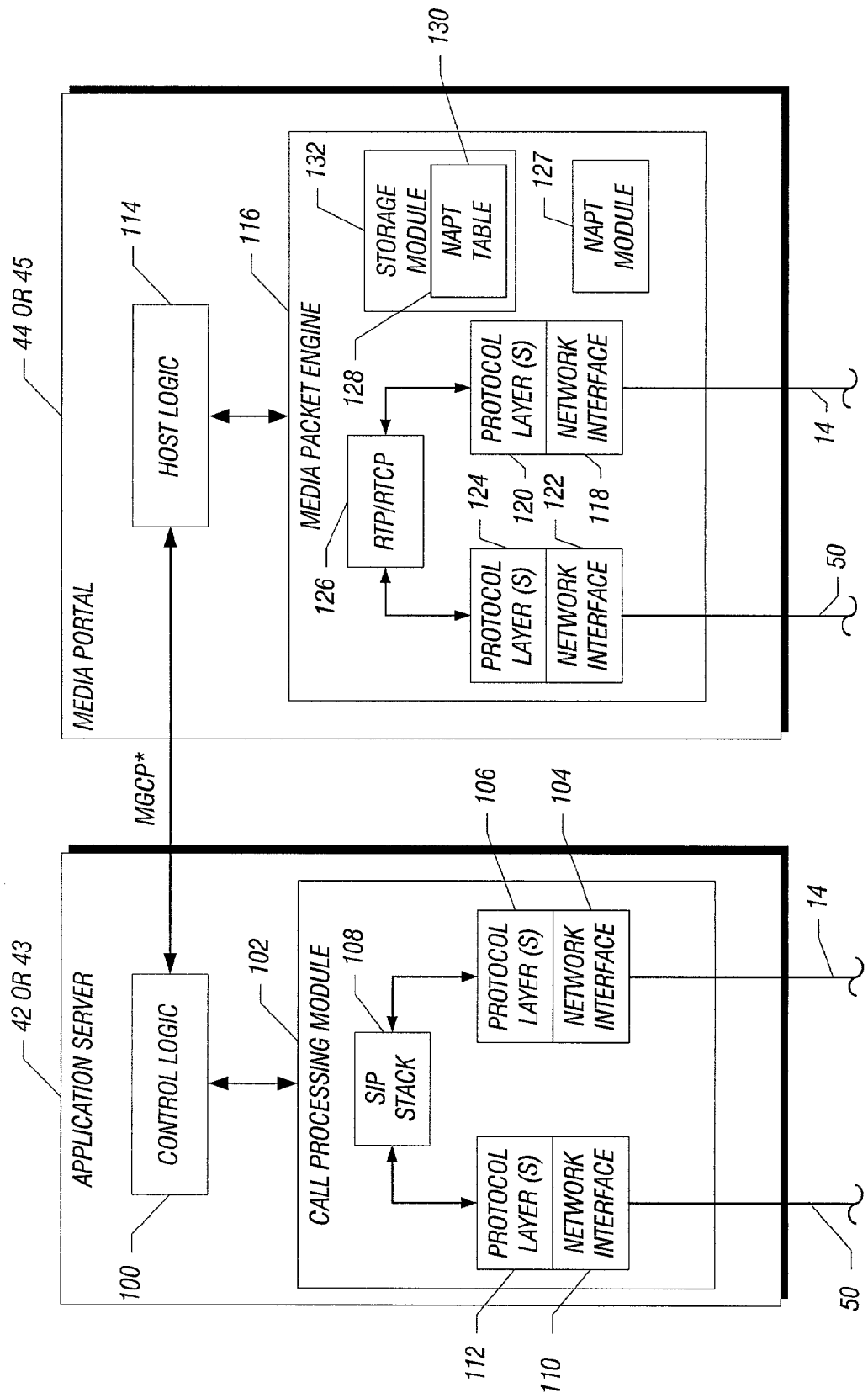
FIG. 2 is a block diagram of components of an application server and a media portal, in accordance with an embodiment.

Referring to FIG. 2, components of the application server 42 or 43 and the media portal 44 or 45 are illustrated. The application server 42 or 43 includes control logic 100 and a call processing module 102. The call processing module 102 receives call control signaling from the public network 14 and the private network 50. The call processing module 102 includes a network interface 104 to the public network 14, one or more protocol layers 106 above the network interface 104, and a SIP stack 108 for processing SIP messages. In one embodiment, the protocol layers 106 include a UDP transport layer and an IP network layer.

The call processing module 102 also includes a second network interface 110 coupled to the private network 50, and one or more protocol layers 112 above the network interface 110.

The control logic 100 of the application server 42 or 43 communicates with host logic 114 in the media portal 44. The control logic 100 and host logic 114, which can be implemented in software or a combination of software and hardware, employ a predefined messaging scheme to exchange messages with each other. In one example, the messaging scheme is according to an enhanced version of the Media Gateway Control Protocol (MGCP), as described in RFC 2705, entitled "Media Gateway Control Protocol (MGCP), Version 1.0," dated October 1999. Enhancements to the MGCP messages are added to support transport of certain types of data between the media portal 44 or 45 and the application server 42 or 43. The enhancements include the introduction of a new format for a parameter (EndpointId) used to identify endpoints and a parameter (referred to as X+NAPTAddressType) to specify the type of network mapping. Such enhancements are explained below.

The media portal 44 or 45 also includes a media packet engine 116. In one embodiment, the media packet engine 116 can be implemented on multiple circuit boards or blades (each with two interfaces to the public and private networks 14 and 50) to enhance concurrent communication of messages. The media packet engine 116 includes a first network interface 118 coupled to the public network 14, and one or more protocol layers 120 above the network interface 118. Similarly, a second network interface 122 is coupled to the private network 50, and one or more protocol layers 124 are provided above the network interface 122. An RTP/RTCP module 126 is also part of the media packet engine 116. RTP, which provides a mechanism for transporting real-time data across a packet-based network, is an application sublayer that typically runs on top of the UDP layer (which is part of the protocol layers 120 or 124). Specified along RTP is the Real-Time Control Protocol (RTCP), which provides a mechanism for sharing various session data between endpoints. In accordance with one embodiment, voice and other forms of real-time data are carried in RTP packets communicated across the public network 14 and the private network 50.

Also included in the media packet engine 116 is an NAPT module 127 and an NAPT table 128 that contains plural entries 130. Each entry of the NAPT table 128 contains mapping information for source and destination addresses and ports of media packets received from the networks 14 and 50. For a given call session involving a first device and a second device, each NAPT table entry includes a first address and port of the first device, a second address and port of the second device, a first alias address and port mapped to the first device address and port, and a second alias address and port mapped to the second device address and port. The contents of each NAPT table entry are discussed further below. The NAPT table entry is dynamically updated as a call session is being established. Once the call session is terminated, the allocated resources in the NAPT table entry are deleted and made available to other call sessions.

The NAPT table 128 is stored in a storage module 132. The NAPT module 127 uses information in the NAPT table 128 to perform network address and port translations.

Figure 3:
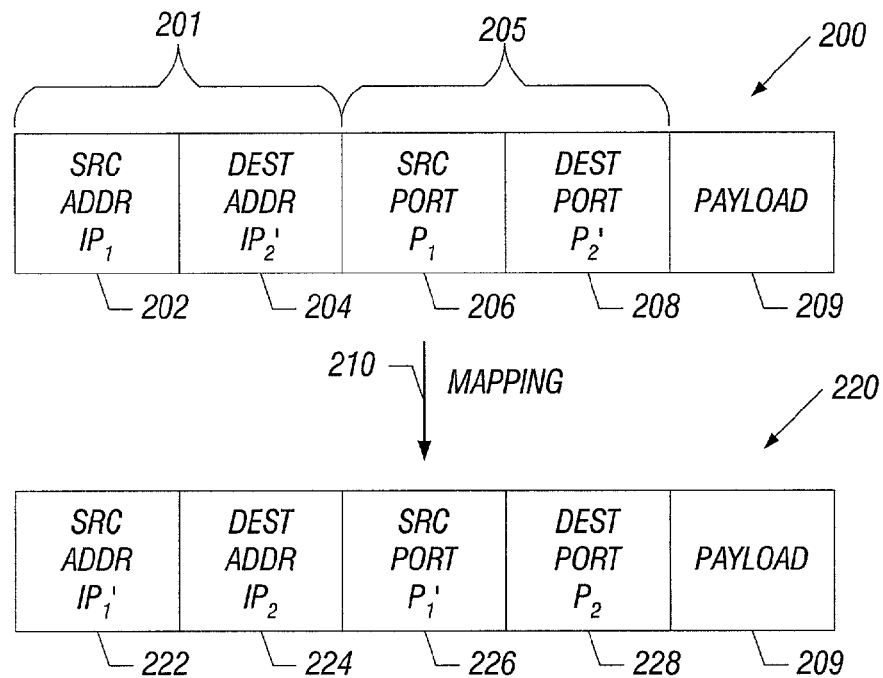
FIG. 3 illustrates mapping of source and destination addresses and ports in a media packet by the media portal.

Referring to FIG. 3, the network address and port translation according to an embodiment is illustrated. A received IP packet 200 contains a payload section 209 (which includes the RTP packet), an IP header 201, and a UDP header 205. The IP header 201 contains a source network address 202 and a destination network address 204, in addition to other information. The UDP header 205 contains a source port 206, a destination port 208, and other information. The IP packet 200 is applied (at 210) through NAPT mapping based on the NAPT table 128. The output packet 220, after the NAPT mapping, includes the same payload 209, but the source and destination addresses and source and destination ports have been translated. The source network address 222 has been translated from IP address $IP_1$ to IP address $IP_1'$, the destination address 224 has been translated from $IP_2'$ to $IP_2$, the source port 226 has been translated from port $P_1$ to port $P_1'$, and the destination port 228 has been translated from port $P_2'$ to port $P_2$.

Figure 4:
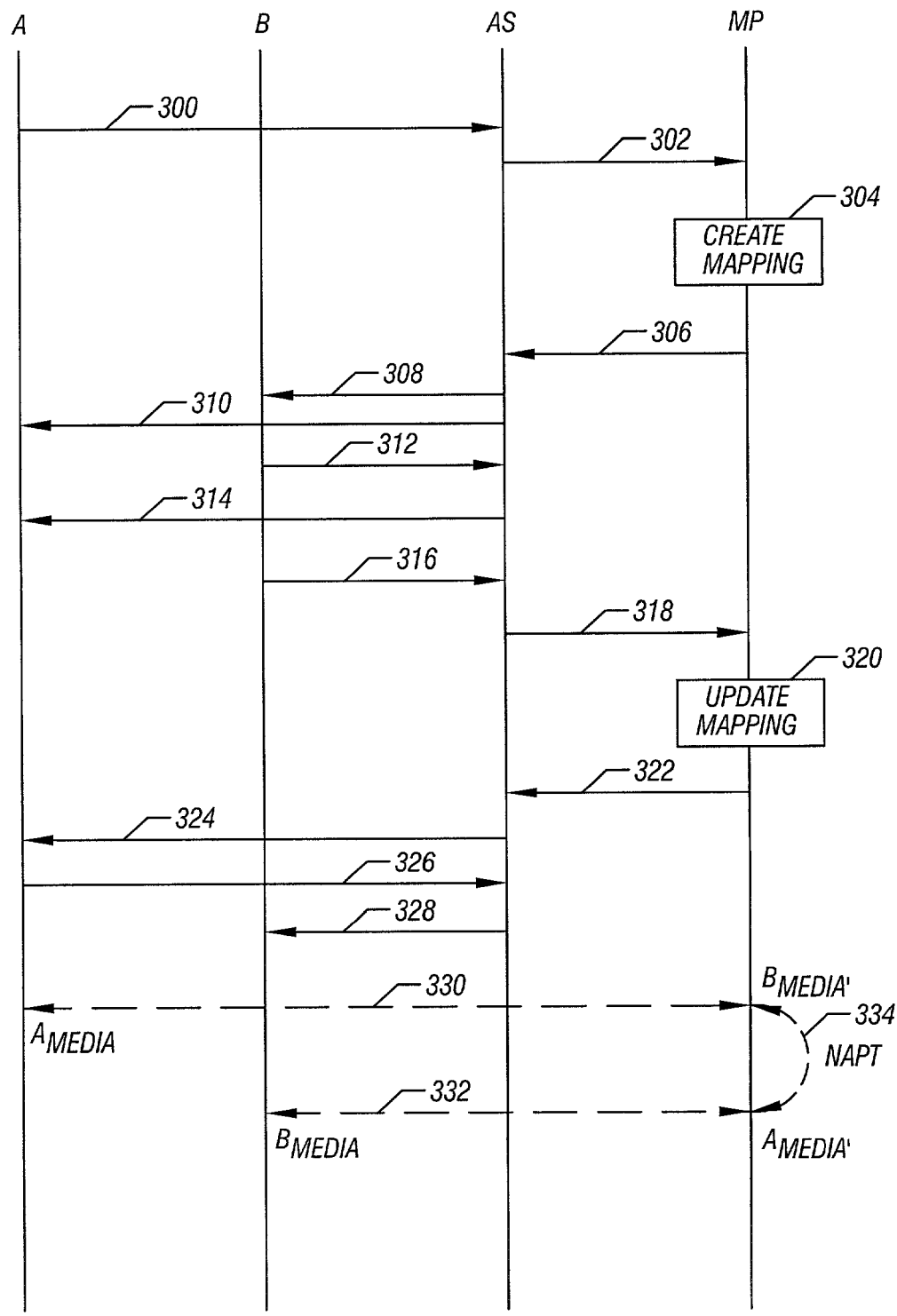
FIG. 4 is a message flow diagram of a call flow between a first user station and a second user station that are part of the same domain.

In an example call flow shown in FIG. 4, a call session is established between user station A and user station B. In the call flow, it is assumed that both user stations are in the same domain and serviced by the same application server (42) and media portal (44). User station A is the initiator of the call. User station A sends (at 300) a call request. If SIP messaging is used, the call request is a SIP INVITE message. The SIP INVITE message is sent to the application server 42. The INVITE message contains the following content (not all elements of the message have been shown):

INVITE
From: A@xxx.com
To: B@xxx.com
SDP: RTP/RTCP 47.1.1.1:1000

In the INVITE message, the From: address represents user station A, and the To: address represents user station B. A Session Description Protocol (SDP) portion contains the network address and port that the destination node or station is to send media packets to once the call is established. SDP is described in RFC 2327, entitled "SDP: Session Description Protocol," dated April 1998. In the example, the network address is 47.1.1.1, and the port number is 1000. The combination of the network address and port is represented as 47.1.1.1:1000. The flag RTP/RTCP indicates that the specified network address and port is the originating network address and port for media packets. More generally, the originating network address and port for user station A is referred to as $A_{media}$, the address and port of user station A for communicating media packets.

Once the application server 42 receives the INVITE message, it performs a location query on the To: address and determines that user station B is in the same domain (xxx.com) as user station A. B is then identified as a valid address. The location query can be performed using data in the database server 48. Next, the application server 42 sends a request (at 302) in real time to the media portal 44 to allocate NAPT resources for performing a network address and port translation of media packets in the requested call session. In one embodiment, the request includes an MGCP CreateConnection.

In response to the request, the media portal 44 allocates (at 304) the necessary resources (addresses and/or ports) to support NAPT for the call session. In one embodiment, the MGCP CreateConnection message format is as follows:

CRCX 1234 A:1000@47.1.1.1 MGCP 0.1
C: 987651
M: recvonly
MGCPVerb=CRCX (CreateConnection)
TransactionId=1234
EndpointId=A:1000@47.1.1.1
MGCPVersion=0.1

CallId=987651
ConnectionMode=recvonly (receive only)

One pertinent field of the CreateConnection message is the parameter EndpointId, which is equated to A:1000@47.1.1.1, where A represents audio. For video or other media, other indicators are used. The EndpointId parameter, which is a parameter whose format has been altered from the standard MGCP-defined EndpointId as an enhancement, identifies the address and port that the media portal 44 is to allocate resources for. The example provided above (and elsewhere in this description) is a relatively simple implementation of EndpointId. Other fuller implementations include providing a larger part of the media description that is in the SDP portion of the INVITE (or other SIP message). Also, a CallId parameter is supplied in the MGCP CreateConnection message. The CallId parameter is used as a key to point to an entry in the NAPT mapping table 128.

The media portal 44 reserves two external IP addresses and ports $A_{media}'$ and $B_{media}'$ (e.g., 201.3.3.3:1010 and 201.3.3.3:2020 for audio), one ($A_{media}'$) that is mapped to the originating endpoint address and port $A_{media}$, and one ($B_{media}'$) that is mapped to the terminating endpoint address and port $B_{media}$ (which is unknown to the media portal at this point). A mapping table entry containing the allocated addresses is shown below:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000 @ 47.1.1.1 | A:2020 @ 201.3.3.3 | A:1010 @ 201.3.3.3 | ? ? ? |

In the above example, OrigEndpoint refers to the originating endpoint address and port $A_{media}$; OrigNAPTAddr refers to the originating NAPT address and port $A_{media}'$ (at the public interface of the media portal) that the terminating endpoint (user station B) is communicating with; TermNAPTAddr refers to the terminating NAPT address and port $B_{media}'$ (also at the public interface of the media portal) that user station A communicates with; and TermEndpoint refers to the terminating endpoint address and port $B_{media}$.

The media portal 44 then returns (at 306) the originating NAPT network address and port ($A_{media}'$, which in the above example is 201.3.3.3:2020) to the application server 42 in a response message (e.g., an MGCP response message). The NAPT network address and port $A_{media}'$ is used to represent user station A to user station B (the called terminal). Similarly, the terminating NAPT network address and port ($B_{media}'$, which in the above example is 201.3.3.3:1010) is used to represent user station B to originating user station A.

The application server 42 then substitutes the network address and port $A_{media}$ (specified in the SDP portion of the original INVITE message) with the originating NAPT network address and port $A_{media}'$. An INVITE message containing $A_{media}'$ is then sent (at 308) to user station B. The content of this INVITE message is shown below:

INVITE
From: A@xxx.com
To: B@xxx.com
SDP: RTP/RTCP 201.3.3.3:2020

The application server 42 also responds (at 310) to user station A with a SIP 100 TRYING message, which indicates that an unspecified action has been taken on behalf of the call but the target has not yet been located. Note that the SIP TRYING message is likely communicated from the application server 42 to user station A as soon as the INVITE message (sent at 300) was received by the application server 42. For example, TRYING may have been communicated by the application server 42 before communication of the CreateConnection request at 302.

In response to the INVITE message sent at 308, user station B responds (at 312) with a SIP 180 RINGING message. At this point, user station B knows to send media packets for the call session to network address and port $A_{media}'$. The SIP 180 RINGING message is propagated (at 314) by the application server 42 back to user station A.

If user station B desires to answer the call request (such as when a user takes the target terminal off the hook, an answering machine answers, and so forth), user station B sends a SIP 200 OK message (at 316) to the application server 42. Some of the content of the SIP 200 OK message is as follows:

SIP 200 OK
From: B@xxx.com
To: A@xxx.com
SDP: RTP/RTCP 54.5.5.5:2000

The SIP 200 OK message contains an SDP portion that specifies the address and port $B_{media}$ of the terminating endpoint. In the example above, the terminating network address and port $B_{media}$ is 54.5.5.5:2000.

In response to the SIP 200 OK message, the application server 42 sends a real-time request (at 318) to the media portal 44 to update the reserved resources (addresses) in the media portal 44 for the current call session. In one example, the request can be in the form of an MGCP ModifyConnection request that has the following content:

MDCX 1236 A:2000@54.5.5.5 MGCP 0.1
C:987651
M: sendrecv
MGCPVerb=MDCX (ModifyConnection)
TransactionId=1236
EndpointId=A:2000@54.5.5.5
MGCPVersion=0.1
CallId=987651
ConnectionMode=sendrecv (send and receive)

The pertinent elements of the ModifyConnection request are the EndpointId parameter, which identifies the terminating network address and port for audio, and the CallId parameter, which is the key to an entry of the mapping table 128.

In an alternative embodiment, an SDP portion may also be included in a SIP RINGING message (or some other message), in which case the acts performed at 318 can be performed in response to that message.

Upon receiving the ModifyConnection message, the media portal 44 uses the CallId parameter as a key to find the associated mapping resources in the NAPT mapping table 128. The terminating endpoint field (TermEndpoint) in the table, which was previously unknown, is filled (at 320) with the terminating network address and port $B_{media}$. The mapped resources are now as follows:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000 @ 47.1.1.1 | A:2020 @ 201.3.3.3 | A:1010 @ 201.3.3.3 | A:2000 @ 54.5.5.5 |

The media portal 44 next returns (at 322) the terminating NAPT network address and port $B_{media}'$ to the application server 42. The application server 42 then substitutes $B_{media}$ with $B_{media}'$ in the SDP portion of the SIP 200 OK message. The modified SIP 200 OK message is then sent (at 324) from the application server 42 to user station A. User station A responds to the SIP 200 OK message with a SIP ACK message (at 326). User station A now knows to send media packets to $B_{media}'$ if user station A wishes to communicate with user station B. The application server 42 propagates the SIP ACK message (at 328) to user station B.

At this point, a media session has been established between user stations A and B through the media portal 44. User station A communicates with network address and port $B_{media}'$ (in the public interface of the media portal 44) at 330, and user station B communicates with network address and port $A_{media}'$ (in the public interface of the media portal 44) at 332. Media packets are routed between B' and A' in the media portal 44 by performing translations (at 334) using the mapping table entry shown above.

The media portal 44 is now able to perform NAPT functions using the NAPT table entries shown above during the established call session between user stations A and B. Note that neither user station A nor user station B are aware of the network address and port of the other endpoint. Thus, the user stations A and B send media packets not directly to each other, but to the media portal 44. Media packets that are sent from user station A arrive at network address and port $B_{media}'$ of the media portal, which are forwarded to user station B via $A_{media}'$. Media packets sent from user station B arrive at network address and port $A_{media}'$, which are forwarded to user station A via $B_{media}'$.

Figure 5:
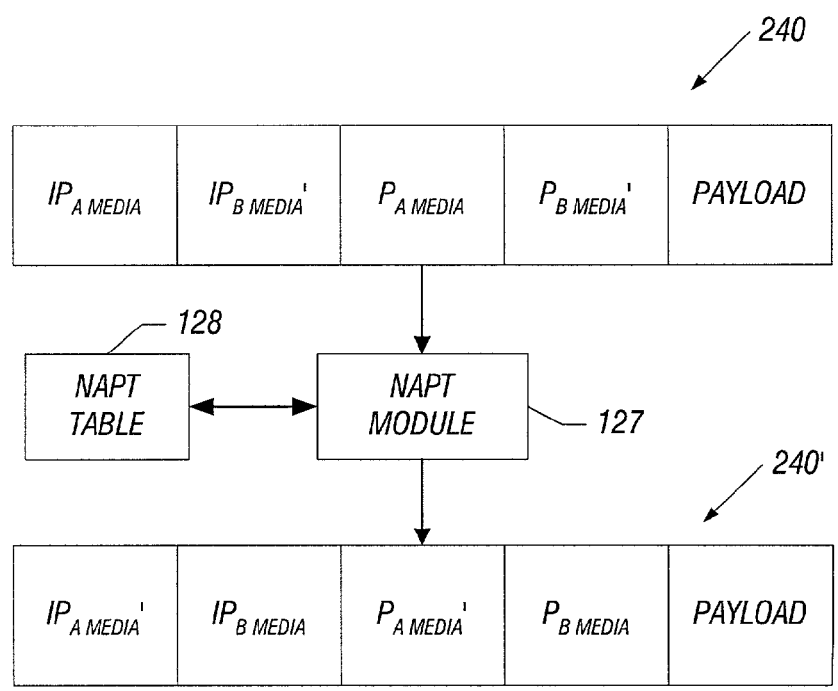
FIG. 5 illustrates mapping of addresses and ports of a media packet communicated in a call session set up by the flow of FIG. 4.

Thus, as shown in FIG. 5, a media packet 240 is originated by user station A. In the media packet, the source IP address is $IP_{Amedia}$, the destination IP address is $IP_{Bmedia'}$, the source UDP port is $P_{Amedia}$, and the destination UDP port is $P_{Bmedia'}$. After conversion of both the source and destination addresses and ports by the mapping module 127 in the media portal 44, the modified media packet 240' contains a source IP address $IP_{Amedia'}$, destination IP address $IP_{Bmedia}$, a source UDP port $P_{Amedia'}$, and a destination UDP port $P_{Bmedia}$. A similar translation process is performed in the reverse direction.

Figure 6:
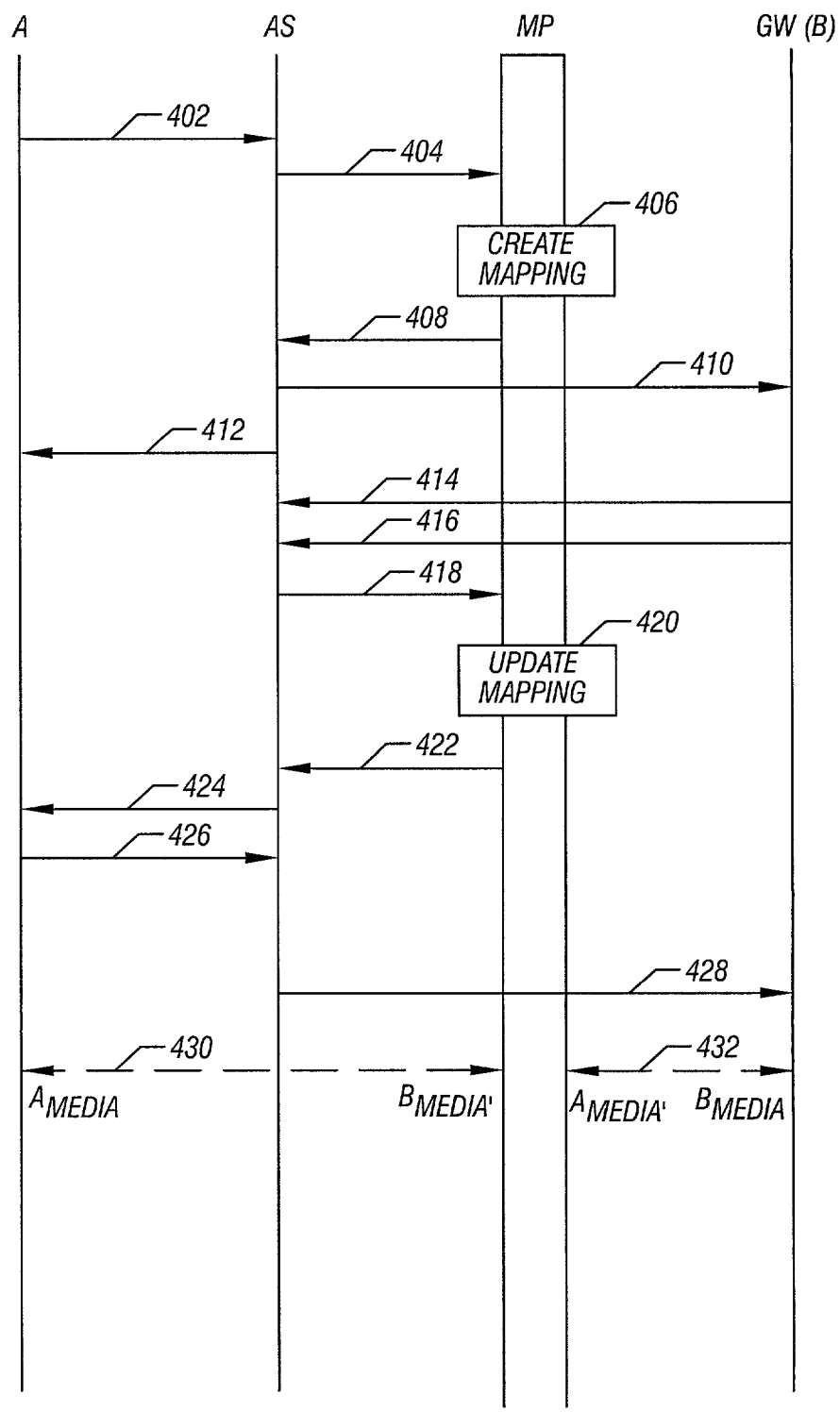
FIG. 6 is a message flow diagram of a call flow between a user station and a gateway coupled to a public-switched telephone network.

Referring to FIG. 6, another call flow is illustrated. This call flow involves an external endpoint (user station A) and an internal node (e.g., the PSTN gateway 36 or the announcement server 49). An "internal node" of the service provider 12 is a node that is connected to the service provider private network 50. In the described example, the destination terminal is a terminal coupled to the PSTN 20, such as the mobile station 30 or wired telephone 34. The gateway 36 provides the endpoint for packet-based communications in calls involving a PSTN-coupled station.

To establish the call, user station A sends (at 402) a call request (e.g., SIP INVITE message) to the application server 42. The To: address of the INVITE message specifies B@xxx.com, with B@xxx.com being the logical address of the destination terminal (e.g., the mobile station 30 or wired station 34). The SDP portion of the INVITE message contains the originating network address and port ($A_{media}$). Upon receiving the SIP INVITE message, the application server 42 performs a location query on the To: address and determines that station B@xxx.com is accessible through an internal network resource, which in this example is the PSTN gateway 36. The application server 42 also determines that user station A is associated with an external (public) network address.

The application server 42 then sends (at 404) a request (e.g., an MGCP CreateConnection message) to the media portal 44 to allocate the necessary addresses to support the NAPT connections on the supplied IP address/port pair ($A_{media}$). A predetermined parameter X+NAPTAddressType is included in the MGCP CreateConnection message to identify the different types (internal or external) of endpoints. The X+NAPTAddressType parameter is also added to the MGCP CreateConnection request as an enhancement. In this example, the NAPT address and port to allocate for communication with user station A should be an external address and port, while the NAPT address and port to allocate for communication with the gateway 36 should be an internal address and port. The application server 42 uses the X+NAPTAddressType parameter to allocate different types of NAPT resource addresses for the different endpoints.

The MGCP CreateConnection message in one example is as follows:

CRCX 1234 A:1000@47.1.1.1 MGCP 0.1
    C: 987651
    M: recvonly
    X+NAPTAddressType: ON:INT, TN:EXT
    MGCPVerb=CRCX (CreateConnection)
    TransactionId=1234
    EndpointId=A:1000@47.1.1.1
    MGCPVersion=0.1
    CallId=987651
    ConnectionMode=recvonly (receive only)
    NAPTAddressType=ON:INT, TN:EXT The parameter X+NAPTAddressType specifies the type of NAPT address for a specific endpoint, either "INT" (Internal) or "EXT" (external). If the X+NAPTAddressType parameter is omitted, the default value of the NAPTAddressType for both the originating endpoint and the terminating endpoint is "EXT." Note that this was the case for the previous call flow (FIG. 4).

In this example, since the originating endpoint is outside the service provider private network 50, the NAPT address and port of the media portal 44 to which A sends packets ($B_{media}'$ or TN) should be an external address. Since the terminating endpoint is inside the service provider private network 50, the NAPT address and port of the media portal 44 to which the gateway 36 sends packets is A' or ON, which should be an internal address. This is specified by the X+NAPTAddressType parameter in the CreateConnection message above.

Next, the media portal 44, based on information in the MGCP CreateConnection message, reserves an internal NAPT address and port ($A_{media}'$, which in the example is 192.168.4.4: 2020), which is mapped to the address and port $A_{media}$ of the originating endpoint. The media portal 44 also reserves an external network address and port ($B_{media}'$, which in the example is 201.3.3.3:1010), which is mapped to the address and port $B_{media}$ of the terminating endpoint (which is still unknown to the media portal 44 at this point). The media portal 44 creates (at 406) a mapping table entry using CallId as a key to map the EndpointId address with the reserved resources. The created example table entry is shown below:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000 @ 47.1.1.1 | A:2020 @ 192.168.4.4 | A:1010 @ 201.3.3.3 | ? ? ? |

The media portal 44 then returns (at 408) the originating NAPT network address and port ($A_{media}'$) to the application server 42 in an MGCP response. The application server 42 performs a substitution of the network address and port in the SDP portion of the original SIP INVITE message, replacing $A_{media}$ with $A_{media}'$. The application server 42 then forwards (at 410) the modified SIP INVITE message to the gateway 36, with the content of the INVITE message as follows:

INVITE

From: A@xxx.com

To: B@xxx.com

SDP: RTP/RTCP 192.168.4.4:2020

The application server 42 also responds to user station A (at 412) with a SIP 100 TRYING message, which can occur any time after 402. The gateway 36 next responds (at 414) to the application server 42 with a SIP 180 RINGING message. When the gateway 36 is ready to answer the call, such as when a user station (e.g., the mobile station 30 or a wired telephone 34) has been taken off hook, the gateway 36 sends (at 416) a SIP 200 OK message to the application server 42. The SIP 200 OK message contains an SDP portion containing the terminating network address and port ($B_{media}$, which in the example is 192.168.5.5:2000). The application server 42 then sends (at 418) a request (e.g., a MGCP ModifyConnection message) to the media portal 44 to update the reserved resources in the mapping table entry. According to one example, the format of the MGCP ModifyConnection request is as follows:

MDCX 1236 A:2000@192.168.5.5 MGCP 0.1

C: 987651

M: sendrecv

MGCPVerb=MDCX (ModifyConnection)

TransactionId=1236

EndpointId=A:2000@192.168.5.5

MGCPVersion=0.1

CallId=987651

ConnectionMode=sendrecv (send and receive)

Using CallId as a key to find the mapping resources in the mapping table 28, the media portal 44 fills (at 420) the previously unknown TermEndpoint address and port with the terminating network address and port $B_{media}$. The updated table entry is as follows:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000 @ 47.1.1.1 | A:2020 @ 192.168.4.4 | A:1010 @ 201.3.3.3 | A:2000 @ 192.168.5.5 |

The media portal 44 then sends (at 422) the terminating NAPT network address and port ($B_{media}'$) to the application server 42. Next, the application server 42 performs a substitution of the network address and port in the SDP portion of the SIP 200 OK message received at 416, replacing $B_{media}$ with $B_{media}'$. The application server 42 then forwards (at 424) the modified SIP 200 OK message to user station A. User station A responds to the SIP 200 OK message with a SIP ACK message (at 426). In response, the application server 42 forwards (at 428) the SIP ACK message to node B. At this point, the media session is established, with a media connection established (at 430) between external address and port $A_{media}$ (user station A) and an external terminating NAPT network address and port $B_{media}'$ at the external interface of the media portal 44. Also, a media connection is established (at 432) between internal network address and port $B_{media}$ (gateway 36) and an internal originating NAPT network address and port $A_{media}'$ at the private interface of the media portal 44.

Thus, in the call session between user station A and gateway 36, both the source and destination addresses and ports are translated as media packets traverse through the media portal 44 between the endpoints.

Figure 7:
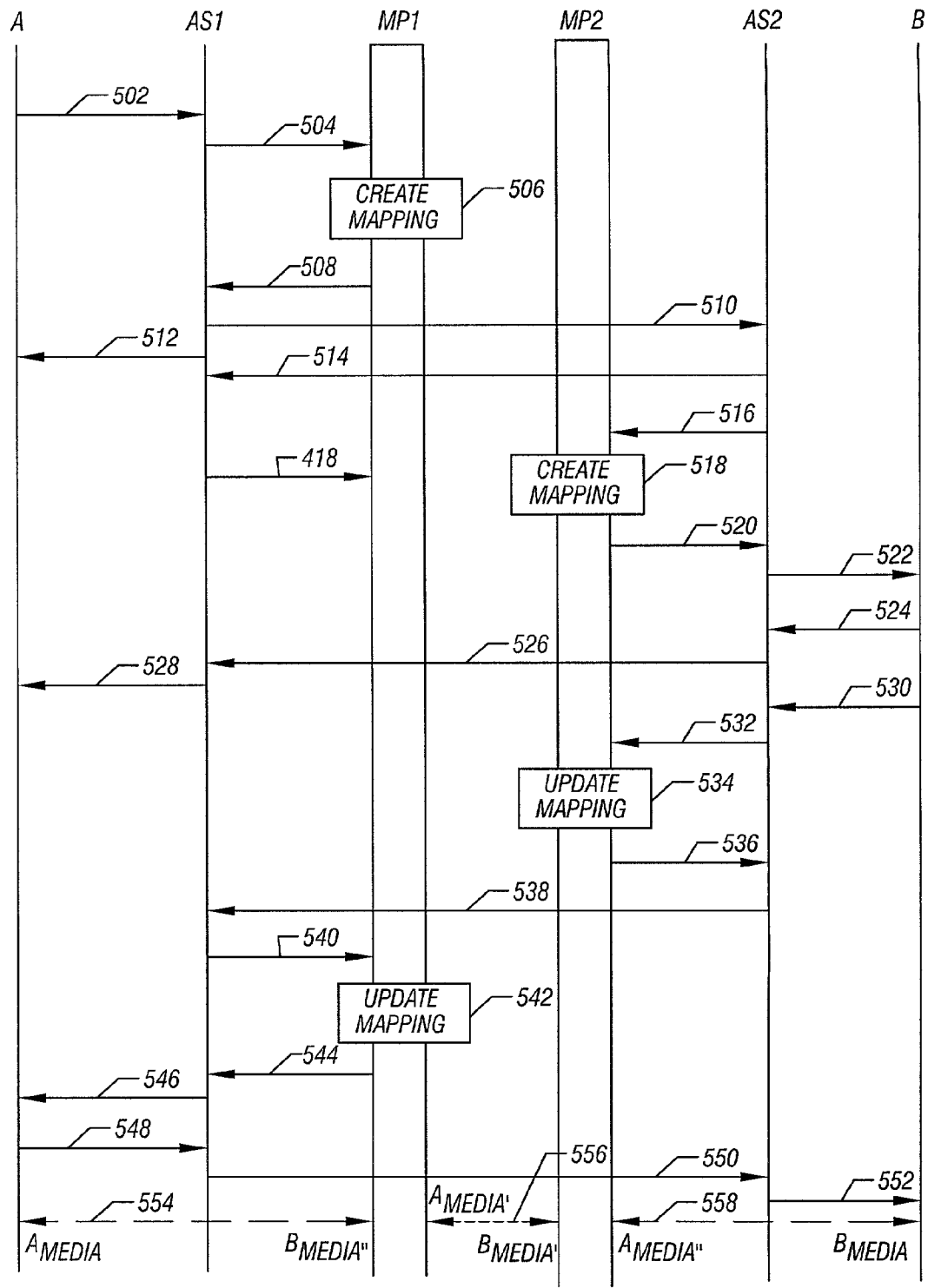
FIG. 7 is a message flow diagram of a call flow between user stations that are in different domains.

Referring to FIG. 7, yet another call flow is illustrated. In this example, the call traverses multiple domains, with a first domain being xxx.com and a second domain being yyy.com. In this scenario, a first application server (42) and media portal (44) is associated with the first domain, and a second application server (43) and media portal (45) is associated with the second domain. It is assumed that both user stations A and B are external to the service provider private network 50.

In the example shown in FIG. 7, user station A initiates the call to user station B. User station A sends a call request (at 502) to the first application server 42. The call request can be in the form of a SIP INVITE message and contains an SDP portion having an originating network address and port $A_{media}$ for communicating media packets in a call session to be established by the INVITE message.

The first application server 42 receives the SIP INVITE message and determines that the originating endpoint (user station A) and the terminating endpoint (user station B) do not belong to the same domains by checking the To: and From: addresses. The originating endpoint is in the domain served by the first application server 42, while the terminating endpoint is in the domain served by the second application server 44. To reach user station B, the first application server 42 has to route the INVITE message to the second application server 43. Since both application servers 42 and 43 and associated media portals 44 and 45 are on the service provider private network 50, media can be exchanged between the first and second media portals 44 and 45 using internal network addresses and ports.

In response to the SIP INVITE message, the first application server sends (at 504) a request (e.g., an MGCP CreateConnection request) to the first media portal 44 to allocate the necessary resources to support NAPT. The first application server 42 uses the X+NAPTAddressType parameter to inform the first media portal 44 to allocate different types of NAPT resource addresses and ports corresponding to each endpoint. In this example, the originating endpoint (user station A) uses an external public network address and port $A_{media}$, so that the NAPT address and port $B_{media}''$ or TN (of the first media portal 44) that interfaces user station A should be an external address and port. The terminating endpoint ($B_{media}'$ on the second media portal) is on the service provider private network 50, so that the address and port $A_{media}'$ or ON (of the first media portal 44) that interfaces the second media portal 45 should be an internal address. The example MGCP CreateConnection message is shown below:

CRCX 1234 A:1000@47.1.1.1 MGCP 0.1
C: 987651
M: recvonly
X+NAPTAddressType: ON:INT, TN:EXT
MGCPVerb=CRCX (CreateConnection)
TransactionId=1234
EndpointId=A:1000@47.1.1.1
MGCPVersion=0.1
CallId=987651
ConnectionMode=recvonly (receive only)
NAPTAddressType=ON:INT, TN:EXT In response to the MGCP CreateConnection request, the first media portal 44 creates (at 506) an NAPT mapping table entry to reserve an internal originating NAPT address and port $A_{media}'$ that is mapped to the originating endpoint address and port $A_{media}$, and an external NAPT address and port $B_{media}''$ that is mapped to the terminating endpoint address and port $B_{media}'$ (unknown to the first media portal 44 at this point). The table entry appears below:

The first application server 42 then performs a substitution of the network address and port in the SDP portion of the original SIP INVITE message, replacing $A_{media}$ with $A_{media}'$. The modified SIP INVITE message is then sent by the first application server (at 510) to the second application server 43.

The first application server 42 also responds (at 512) to the originating endpoint (user station A) with a SIP 100 TRYING message. Note that the TRYING message is likely sent before 504. The second application server 43 also responds (at 514) to the SIP INVITE message of the first application server 42 with a SIP 100 TRYING message. Next, the second application server 43 sends (at 516) an MGCP CreateConnection request to the second media portal 45 to allocate the necessary resources to support NAPT.

The originating endpoint from the perspective of the second application server 43 is the first application server 42 and the first media portal 44, which are on the service provider private network 50. On the other hand, the terminating endpoint (user station B) is a public network client served by the second application server 43. The second application server 43 uses the X+NAPTAddressType parameter to inform the second media portal 44 to allocate different types of NAPT resource addresses appropriate to each endpoint. In this example, the originating endpoint ($A_{media}'$ on the first media portal) uses an internal network address and port, so the address and port $B_{media}'$ (TN) of the second media portal 45 that interfaces originating endpoint network address and port $A_{media}'$ should be an internal address. The terminating endpoint (user station B) has an external public address and port, so that the address and port $A_{media}''$ (ON) of the second media portal 45 that interfaces the terminating endpoint network address and port $B_{media}$ should be an external address and port. The MGCP CreateConnection message according to this example is shown as follows:

CRCX 1235 A:2020@192.168.3.3 MGCP 0.1
C: 987651
M: recvonly
X+NAPTAddressType: ON:EXT, TN:INT
MGCPVerb=CRCX (CreateConnection)
TransactionId=1235
EndpointId=A:2020@192.168.3.3
MGCPVersion=0.1
CallId=987651
ConnectionMode=recvonly (receive only)
NAPTAddressType=ON:EXT, TN:INT In response to the CreateConnection request, the second media portal reserves an external NAPT network address and port ($A_{media}''$) that is mapped to the originating network address and port $A_{media}'$ and an internal network address and port $B_{media}'$ that is mapped to the terminating endpoint network address and port $B_{media}$ (unknown at this point to the second media portal). The second media portal 45 creates (at 518) a table entry using CallId as a key to map

| CallId | OrigEndpoint ($A_{media}$) | OrigNAPTAddr ($A_{media}'$) | TermNAPTAddr ($B_{media}''$) | TermEndpoint ($B_{media}'$) |
|---|---|---|---|---|
| 987651 | A:1000 @ 47.1.1.1 | A:2020 @ 192.168.3.3 | A:1010 @ 201.3.3.3 | ? ? ? |

Next, the first media portal sends (at 508) an MGCP response containing the originating NAPT network address and port ($A_{media}'$) to the first application server 42.

EndpointId in the CreateConnection request with two reserved resources ($A_{media}''$ and $B_{media}'$). The created mapping table entry in the second media portal is shown below:

| CallId | OrigEndpoint ($A_{media}'$) | OrigNAPTAddr ($A_{media}''$) | TermNAPTAddr ($B_{media}'$) | TermEndpoint ($B_{media}$) |
|---|---|---|---|---|
| 987651 | A:2020 @ 192.168.3.3 | A:2020 @ 201.6.6.6 | A:1010 @ 192.168.6.6 | ? ? ? |

The second media portal 45 then returns (at 520) the originating NAPT network address and port ($A_{media}''$) to the second application server 43.

Next, the second application server 43 performs a substitution of the network address and port in the SDP portion of the SIP INVITE message received from the first application server 42 by replacing $A_{media}'$ with $A_{media}''$ and forwards (at 522) the modified INVITE message to user station B. In response to the INVITE request, user station B responds with a SIP 180 RINGING message (at 524). The SIP 180 RINGING message is propagated (at 526) from the second application server 43 to the first application server 42. The first application server 42 then propagates (at 528) the SIP 180 RINGING message to user station A.

When user station B answers, a SIP 200 OK message is sent (at 530) to the second application server 43. This SIP 200 OK message contains an SDP portion having the terminating network address and port $B_{media}$. The second application server 43 then sends a request (at 532) to update the NAPT table entry in the second media portal 45. This can be in the form of an MGCP ModifyConnection request as shown below:

MDCX 1236 A:2000@47.5.5.5 MGCP 0.1
C: 987651
M: sendrecv
MGCPVerb=MDCX (ModifyConnection)
TransactionId=1236
EndpointId=A:2000@47.5.5.5
MGCPVersion=0.1
CallId=987651
ConnectionMode=sendrecv (send and receive)

Using the CallId parameter as a key, the EndpointId address contained in the ModifyConnection request is used to fill (at 534) the TermEndpoint column of the NAPT mapping table entry. The updated mapping table entry in the second media portal 45 is shown below:

application server 43 then performs a substitution of the address and port in the SDP portion of the SIP 200 OK message from user station B, by replacing $B_{media}$ with $B_{media}'$. The modified SIP 200 OK message is sent (at 538) to the first application server 42. The modified SIP 200 OK message contains $B_{media}'$ as the terminating network and address port for the first application server 42. In response to the SIP 200 OK message, the first application server 42 sends (at 540) an MGCP ModifyConnection request to the first media portal 44 to update the NAPT mapping table entry. An example of the MGCP ModifyConnection request is shown below:

MDCX 1237 A:1010@192.168.6.6 MGCP 0.1
C: 987651
M: sendrecv
MGCPVerb=MDCX (ModifyConnection)
TransactionId=1237
EndpointId=A:1010@192.168.6.6
MGCPVersion=0.1
CallId=987651
ConnectionMode=sendrecv (send and receive)

The first media portal 44 uses the CallId parameter in the ModifyConnection request as a key to find the mapping table entry, and updates (542) the TermEndpoint field of the table entry, with the updated table entry shown below:

| CallId | OrigEndpoint ($A_{media}$) | OrigNAPTAddr ($A_{media}'$) | TermNAPTAddr ($B_{media}''$) | TermEndpoint ($B_{media}'$) |
|---|---|---|---|---|
| 987651 | A:1000 @ 47.1.1.1 | A:2020 @ 192.168.3.3 | A:1010 @ 201.3.3.3 | A:1010 @ 192.168.6.6 |

The first media portal 44 sends (at 544) an MGCP response containing the terminating NAPT network address and port ($B_{media}''$) to the first application server 42. The first application server 42 then performs a substitution of the address and port in the SDP portion of the SIP 200 OK message received from the second application server 43 by substituting $B_{media}'$ with $B_{media}''$. The first application server 42 sends (at 546) the modified SIP 200 OK message (containing $B_{media}''$ in its SDP portion) to user station A.

In response, user station A sends (at 548) a SIP ACK message, which is propagated (at 550) by the first applica-

| CallId | OrigEndpoint ($A_{media}'$) | OrigNAPTAddr ($A_{media}''$) | TermNAPTAddr ($B_{media}'$) | TermEndpoint ($B_{media}$) |
|---|---|---|---|---|
| 987651 | A:2020 @ 192.168.3.3 | A:2020 @ 201.6.6.6 | A:1010 @ 192.168.6.6 | A:2000 @ 47.5.5.5 |

The second media portal 45 then sends a response (at 536) containing the terminating NAPT address and port pair ($B_{media}'$) to the second application server 43. The second tion server 42 to the second application server 43. The second application server then propagates (at 552) the SIP ACK message to user station B.

At this point, a media session is established between user stations A and B through the first and second media portals 44 and 45. The media session includes a media connection between $A_{media}$ (network address and port of user station A) and $B_{media}"$ (external network address and port of the first media portal) at 554, between $A_{media}'$ (internal network address and port of the first media portal) and $B_{media}'$ (internal network address and port of the second media portal) at 556, and between $A_{media}"$ (external network address and port of the second media portal) and $B_{media}$ (network address and port of user station B) at 558. Thus, a media packet from user station A is directed to $B_{media}"$. Upon arrival at $B_{media}"$, the first media portal performs NAPT translation of both the source and destination addresses and ports and forwards the modified media packet from $A_{media}'$ to $B_{media}'$. On the return path, a media packet is received from $B_{media}'$ (of the second media portal) at $A_{media}'$ (of the first media portal). Upon arrival at $A_{media}'$, the first media portal performs NAPT on the source and destination addresses and ports and forwards the modified media packet from $B_{media}"$ to $A_{media}$.

Similarly, on the second media portal side, a media packet from $A_{media}'$ (of first media portal) is received at $B_{media}'$. Upon arrival at $B_{media}'$, the second media portal performs NAPT of the source and destination addresses and ports and forwards the modified media packet from $A_{media}"$ to $B_{media}$. On the return path, a media packet from $B_{media}$ is received at $A_{media}"$. Upon arrival at $A_{media}"$, the second media portal performs NAPT translation and forwards the modified media packet from $B_{media}'$ to $A_{media}'$.

The call flow examples presented herein are not intended to be exhaustive, as other scenarios may also be possible.

Figure 8:
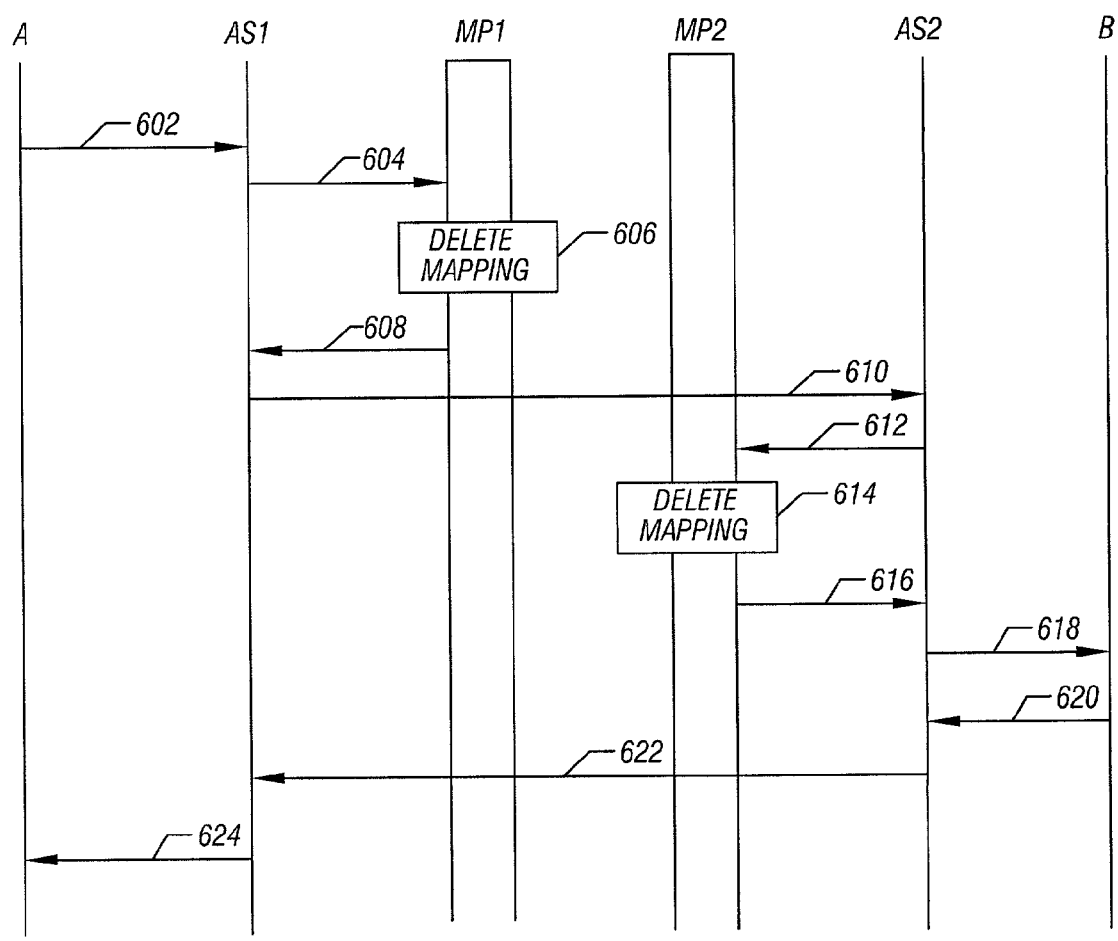
FIG. 8 is a message flow diagram of a call release flow between user stations of FIG. 7.

When a call session is terminated, then resources reserved in each media portal are also released. This enables these resources (IP addresses and ports) to be dynamically re-used as needed. FIG. 8 shows an example of a call takedown and freeing of media resources in the first and second media portals in the example of FIG. 7.

In the example of FIG. 8, user station A initiates the call release. User station A sends (at 602) a call release request (e.g., a SIP BYE message) to the first application server 42. In response to the SIP BYE message, the first application server 42 sends (at 604) a request to the first media portal 44 to delete all connections and to clean up resources that were allocated for the supplied CallId in the SIP BYE message. An example of this request is an MGCP DeleteConnection request, as shown below:

DLCX 1238 MGCP 0.1
C: 987651
MGCPVerb=DLCX (DeleteConnection)
TransactionId=1238
MGCPVersion=0.1
CallId=987651

The first media portal 44 uses the CallId parameter as a key to find the associated mapping table entry and deletes (at 606) all addresses allocated for this entry. The first media portal 44 then sends (at 608) a response back to the first application server indicating successful operation.

The first application server 42 then propagates (at 610) the BYE message to the second application server 43. The second application server 43 sends (at 612) an MGCP DeleteConnection request to the second media portal 44. An example of the DeleteConnection request is as follows:

DLCX 1239 MGCP 0.1
C: 987651
MGCPVerb=DLCX (DeleteConnection)
TransactionId=1239
MGCPVersion=0.1
CallId=987651

The second media portal uses the CallId parameter as a key to find the mapping table entry and deletes (at 614) all addresses and ports in the entry. All resources that were allocated for the supplied CallId are cleaned up.

The second media portal then sends (at 616) a response indicating successful operation. Next, the second application server 43 propagates (at 618) the BYE message to user station B. User station B responds to the BYE message by sending (at 620) a SIP 200 OK message. The SIP 200 OK message is then forwarded (at 622) by the second application server 43 to the first application server 42, which in turn propagates (at 624) the SIP 200 OK message to user station B. At this point, the call session is terminated.

The various nodes and systems discussed each includes various software routines or modules. Such software routines or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two. Although used in the singular sense, a "controller" can also refer to plural hardware components, plural software components, or a combination thereof.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various devices or systems are stored in respective storage devices. The instructions when executed by a respective control unit cause the corresponding node or system to perform programmed acts.

The instructions of the software routines or modules are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system capable of communicating with plural devices on one or more networks, comprising:
    a storage module to store address and port translation information; and a controller adapted to:
  receive a data unit from a first network, the data unit having a source address, a source port, a destination address, and a destination port,
  translate both the source address and the destination address of the data unit and both the source port and destination port of the data unit based on the address and port translation information,
  partially create the address and port translation information in response to a request corresponding to a first Session Initiation Protocol (SIP) message to set up a communications session between a first device and a second device; and
  complete the address and port translation information in response to a second request corresponding to a SIP acknowledgment message responsive to the first SIP message.

2. The system of claim 1, wherein the address and port translation information contains a first address and port associated with a first device and a second address and port associated with a second device, the address and port translation information to map the first address and port to a first alias address and port and to map the second address and port to a second alias address and port.

3. The system of claim 1, wherein the controller is adapted to further transmit the data unit containing the translated source address and source port and destination address and destination port to the first network or another network.

4. The system of claim 1, wherein the data unit comprises an Internet Protocol (IP) header having a source IP address and a destination IP address, and a User Datagram Protocol (UDP) header having a source UDP port and a destination UDP port, and wherein the controller is adapted to translate both the source IP address and destination IP address and both the source UDP port and destination UDP port.

5. The system of claim 1, wherein the data unit contains Real-Time Protocol data.

6. The system of claim 1, wherein the controller comprises a media portal adapted to communicate data units containing media data between plural devices, the system further comprising an agent adapted to perform call control signaling to establish a call session in which the data units are communicated.

7. The system of claim 6, wherein the agent is adapted to communicate requests to the controller to dynamically create and update the address and port translation information in a call session.

8. The system of claim 1, wherein the data unit comprises a data unit to be communicated between at least two devices in a call session.

9. The system of claim 1, wherein the first SIP message comprises a SIP Invite message, and the SIP acknowledgment message comprises a SIP OK message.

10. A method of communicating between two endpoints, comprising:
  in a communications portal, providing a first interface to a first device and providing a second interface to a second device;
  transporting data units, through the communications portal, between the first device and the second device;
  the communications portal hiding an address of the first device from the second device and hiding an address of the second device from the first device;
  storing address translation information;
  translating both a source address and a destination address of each data unit;
  partially creating the address translation information in response to a first Session Initiation Protocol (SIP) message to set up a communications session between the first device and the second device; and
  completing the address translation information in response to a SIP acknowledgment message responsive to the first SIP message.

11. The method of claim 10, wherein storing the address translation information comprises storing a first device address associated with the first device and a second device address associated with the second device, and storing a first alias address mapped to the first device address and a second alias address mapped to the second device address.

12. The method of claim 11, wherein providing the first interface comprises providing the second alias address to represent the second device to the first device, and providing the second interface comprises providing the first alias address to represent the first device to the second device.

13. The method of claim 10, further comprising:
  storing port translation information; and
  translating both a source port and a destination port of each data unit.

14. The method of claim 13, wherein translating the source address and destination address of each data unit and translating the source port and destination port of each data unit is performed by the communications portal.

15. The method of claim 13, wherein translating the source and destination addresses and ports comprises translating Internet Protocol addresses and User Datagram Protocol ports.

16. An article comprising at least one storage medium containing instructions that when executed cause a system to:
  store address translation information;
  receive a data unit containing a source address and a destination address;
  translate both the source and destination addresses of the data unit based on the address translation information;
  partially create the address translation information in response to a first request corresponding to a first Session Initiation Protocol (SIP) message to set up a communications session between a first terminal and second terminal; and
  complete the address translation information in response to a second request corresponding to a SIP acknowledgment message responsive to the first SIP message.

17. The article of claim 16, wherein the instructions when executed cause the system to further store the address translation information as an entry in an address translation table having plural entries.

18. The article of claim 17, wherein the instructions when executed cause the system to use different entries of the address translation table for different communications sessions.

19. The article of claim 16, wherein the instructions when executed cause the system to transmit the data unit with the translated source and destination addresses.

20. The article of claim 16, wherein the instructions when executed cause the system to further store port translation information, and to translate both the source and destination port of the data unit based on the port translation information.

21. The article of claim 16, wherein the instructions when executed cause the system to receive the data unit comprising an Internet Protocol packet.

22. The article of claim 16, wherein the instructions when executed cause the system to further:
- allocate an address for the communications session, the address being part of the address translation information; and
- deallocate the address in response to termination of the communications session.

23. The article of claim 22, wherein the instructions when executed cause the system to further use the deallocated address for another communications session as needed.

24. The article of claim 16, wherein the first SIP message comprises a SIP Invite message, and the SIP acknowledgment message comprises a SIP OK message.

* * * * *